United States Patent
Bowie et al.

(10) Patent No.: US 10,774,975 B2
(45) Date of Patent: Sep. 15, 2020

(54) PIPELINE TOOL

(75) Inventors: Angus George Bowie, Aberdeen (GB); Dale Millward, Aberdeenshire (GB)

(73) Assignee: STATS (UK) Limited, Aberdeenshire (GB)

(*) Notice: Subject to any disclaimer, the term of this patent is extended or adjusted under 35 U.S.C. 154(b) by 379 days.

(21) Appl. No.: 12/915,415

(22) Filed: Oct. 29, 2010

(65) Prior Publication Data
US 2011/0100644 A1  May 5, 2011

(30) Foreign Application Priority Data
Oct. 30, 2009 (GB) .................................. 0918992.9

(51) Int. Cl.
*E21B 34/10* (2006.01)
*F16L 55/38* (2006.01)
*F16L 55/128* (2006.01)
*F16L 55/44* (2006.01)

(52) U.S. Cl.
CPC ........... *F16L 55/38* (2013.01); *F16L 55/1283* (2013.01); *F16L 55/44* (2013.01)

(58) Field of Classification Search
CPC ........ F16L 55/38; E21B 33/127; E21B 37/10; E21B 43/121; E21B 34/07; E21B 34/10; B08B 9/04; B08B 9/053; B08B 9/0553; B08B 9/0551
USPC ...................... 15/104.061; 166/324, 327, 153
IPC ................................................ E21B 34/10,34/00
See application file for complete search history.

(56) References Cited

U.S. PATENT DOCUMENTS

| | | | | |
|---|---|---|---|---|
| 3,600,736 A | * | 8/1971 | Smith et al. | 15/104.061 |
| 3,708,819 A | * | 1/1973 | Breston | B08B 9/035 134/8 |
| 3,835,889 A | * | 9/1974 | Hyde | 138/93 |
| 6,070,285 A | * | 6/2000 | Geppert | 15/104.061 |
| 6,328,072 B1 | * | 12/2001 | Mahe et al. | 138/46 |

(Continued)

FOREIGN PATENT DOCUMENTS

| | | | | |
|---|---|---|---|---|
| EP | 240851 | * | 10/1987 | F16L 55/12 |
| EP | 0240851 A2 | | 10/1987 | |

(Continued)

OTHER PUBLICATIONS

Machine Translation EP 240851.*

(Continued)

*Primary Examiner* — Shay Karls
(74) *Attorney, Agent, or Firm* — Carlson, Gaskey & Olds, P.C.

(57) ABSTRACT

A bi-directional pipeline tool has a body or location in a pipe. A seal element is mounted on the body, the seal element having oppositely directed seal portions with a first seal portion directed towards a first side of the body and a second seal portion directed towards a second side of the body. A valve is provided in the body, the valve having a first port for communicating with fluid on the first side, a second port for communicating with fluid on the second side, and a third port for providing access to a chamber between the seal element and the body. In use, a pressure differential is developed across the tool between fluid upstream of the tool and fluid downstream of the tool. The valve permitting activation of the downstream seal portion, whichever of the portions is the downstream seal portion, by the upstream fluid pressure.

16 Claims, 3 Drawing Sheets

(56) References Cited

U.S. PATENT DOCUMENTS

| | | | |
|---|---|---|---|
| 6,857,158 B1* | 2/2005 | Hunter | B08B 9/0553 |
| | | | 134/167 C |
| 6,874,193 B2* | 4/2005 | Pruett | 15/104.061 |
| 2002/0062963 A1* | 5/2002 | Eslinger et al. | 166/308 |
| 2009/0307857 A1* | 12/2009 | Hestenes | B08B 9/0557 |
| | | | 15/104.061 |

FOREIGN PATENT DOCUMENTS

| | | | |
|---|---|---|---|
| GB | 1280102 | 7/1972 | |
| GB | 2243428 A | * 10/1991 | F16L 55/134 |

OTHER PUBLICATIONS

European Search Report dated Apr. 27, 2012 for EP Application No. 10251878.

United Kingdom Search Report for Application No. GB1018354.9 dated Feb. 7, 2011.

\* cited by examiner

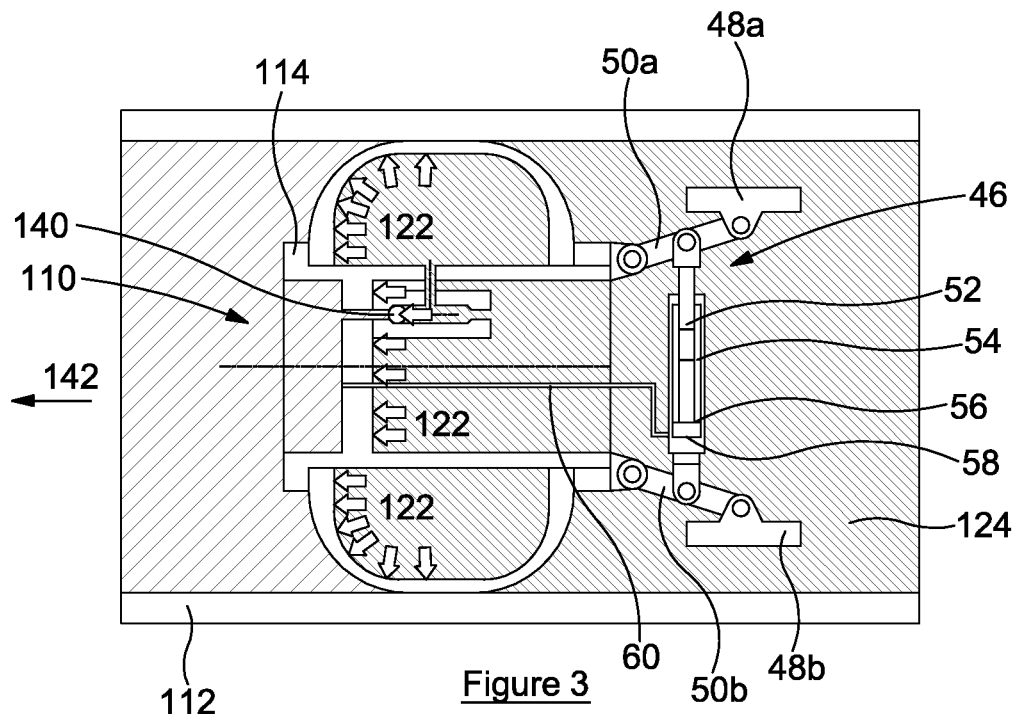
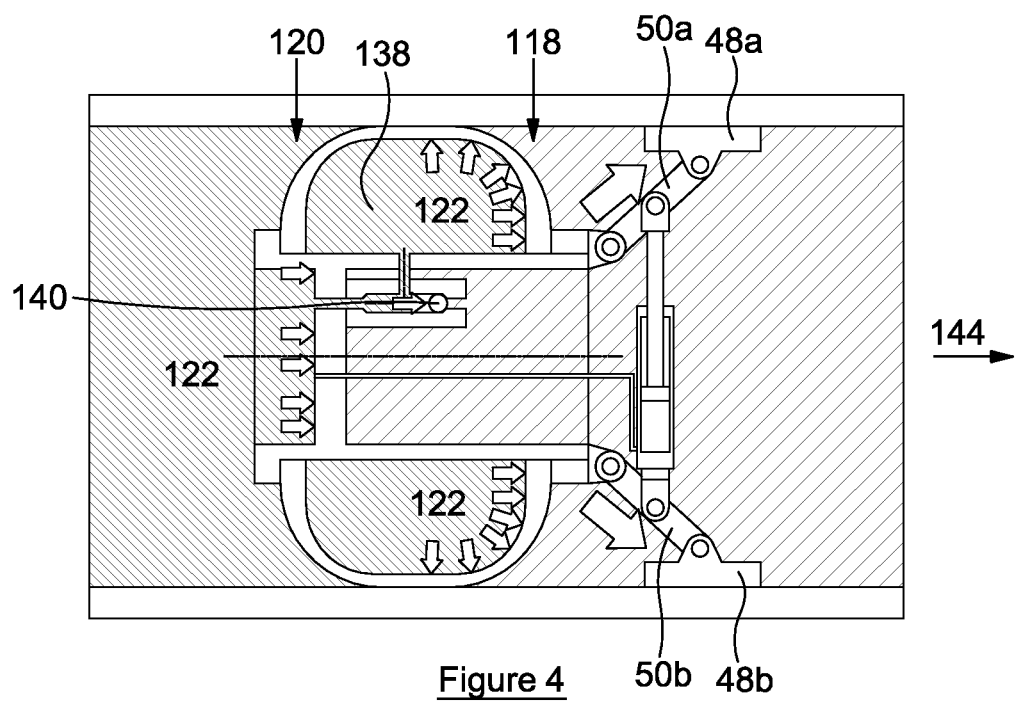

PIPELINE TOOL

REFERENCE TO RELATED APPLICATION

This application claims priority to United Kingdom Application No. GB 0918992.9 filed Oct. 30, 2009.

FIELD OF THE INVENTION

This invention relates to a pipeline tool, and in particular, but not exclusively, to a bi-directional pigging tool.

BACKGROUND OF THE INVENTION

In many industries, it may be necessary to send tooling through a tubular component such as a pipe, for example for pipeline inspection, cleaning, testing, isolation and the like. In the oil and gas industry, one way of transporting tooling through a pipe is via a pig or pigging tool. A pigging tool is a device that can be located within a pipe and transported through the pipe by fluid flow. Typically, a seal is generated between the pigging tool and the pipe wall in order that the pressure force from the pipe flow can be used to propel the tool through the pipe.

In solid body pigging tools, for example, one system for generating a seal is to use a pre-formed cup disc seal arrangement. The seal includes a pre-formed cup shaped seal member that is coupled to the pigging tool body. In use, upstream pressure within the pipe deforms the seal cup, thereby pushing the outer lip of the seal into engagement with the pipe wall.

An alternative system uses one or more substantially planar discs coupled to the pigging tool body. The discs are typically constructed from a polymeric material, such as polyurethane, and are of larger outer diameter than the pipe internal diameter. The discs are deflected into the desired cup shape as the tool is inserted into the pipe. In use, the profile of the deformed discs may be reversed, or flipped, when the flow in the pipe is reversed, thus facilitating operation of the tool in forward and reverse directions.

In general, the choice of system adopted depends on the operational requirements of the tool. For example, the pre-formed cup disc system is most suitable for use in performing pigging operations under higher pressure pipe flow conditions, the higher pressure facilitating the transport of heavier payloads on the pigging tool. However, the internal surface of a pipe may be non-uniform, and it is known that the lip of the pre-formed cup is susceptible to snagging in the pipe, this preventing the pigging tool from operation in a reverse direction. Where the tool encounters an impassable obstruction in the pipe, this can represent a significant problem. Typically, where an obstruction is encountered in the pipe, which prevents passage of the pigging tool, the flow in the pipe is reversed to dislodge or otherwise facilitate removal of the obstruction or the tool from the pipe. However, reversal of the pressure on the pre-formed cup disc acts to apply pressure to the outside of the cup, which tends to push the cup away from the pipe inner wall, thereby causing bypass of the seal. Thus, flow reversal may not be suitable to facilitate recovery of the tool.

The planar disc seal system has the advantage that it is capable of effective operation in more than one direction. However, substantial force is required to insert the tool into a pipe due to the requirement to deflect the discs during insertion. Furthermore, deflection of the discs applies a significant load onto the outer edge of the discs resulting in wear and reduced operational life of the tool. The disc seal system is also known to be less compliant to changes and/or variations in pipe inner diameter than, for example, the pre-formed cup disc system. Moreover, in use, where the pressure on the tool exceeds the load required to flip the discs, the discs may involuntarily invert. This may reduce the pressure retaining capability of the tool and may cause the tool to stall.

Where a tool has stalled in the pipe, this may be overcome by inverting the flow direction in the pipe to move the tool in a reverse direction. However, the orientation of the discs may only be reversed or flipped back where sufficient differential pressure can be applied to the tool by the reverse flow.

SUMMARY OF THE INVENTION

According to a first aspect of the present invention there is provided a pipeline tool including a body adapted for location in a pipe containing a flowing fluid, a fluid pressure activated seal element coupled to the body, the seal element including oppositely directed seal portions, and a valve arrangement adapted to permit activation of the downstream seal portion by upstream fluid pressure.

The tool may include a pigging tool. The tool may include a bi-directional tool. The tool may include a bi-directional pigging tool. The tool may be configured to isolate a section of a pipe.

On insertion into the pipe, the tool shall obstruct fluid flow through the pipe such that a fluid pressure differential may be created across the tool between fluid upstream of the tool and fluid downstream of the tool. The tool shall therefore be motivated through the pipe by the pressure differential.

The seal element may be adapted for inflation by the upstream fluid pressure. For example, the valve may be adapted to provide fluid communication between the upstream fluid and the seal element to facilitate activation of the downstream seal portion.

The tool may be adapted to define a chamber between the seal element and the body, and the chamber may be adapted to receive the upstream fluid until the chamber pressure is of substantially equal pressure to that of the upstream fluid pressure. Where the chamber pressure is substantially equal to the upstream pressure, there will be substantially no pressure differential across the upstream seal portion. However, the pressure differential may act across the downstream seal portion, thereby deforming the downstream seal portion into a cup shaped sealing surface. The downstream seal portion may thus be urged into sealing or enhanced sealing engagement with the pipe wall.

Beneficially, the downstream seal portion may be activated by the upstream fluid pressure regardless of the direction of fluid flow through the pipe. For example, where the direction of fluid flow is reversed, the differential pressure acts in the opposite direction and the tool may be adapted for operation in the reverse direction.

The tool may be adapted for bi-directional operation by selecting the flow direction in the pipe and without the requirement to apply a significant force to the seal element as may otherwise be required, for example, to flip the discs of a conventional disc seal system. Furthermore, a tool according to embodiments of the present invention may be adapted for bi-directional operation with high pipe pressures, thus facilitating the transport of greater payloads on the tool.

The valve may be of any suitable construction. For example, the valve may comprise a dual acting check valve. The valve may include a port in fluid communication with the upstream fluid and a port in fluid communication with the downstream fluid. The valve may further include a third port for providing fluid communication with the chamber. For example, the valve may include a valve member adapted to selectively open and close access to the first and second ports. In particular embodiments, the valve member may be adapted for movement by the upstream fluid pressure.

The seal element may be of any suitable form. In particular embodiments, the seal element may comprise a toroidal or tire-shaped seal element or the like. Beneficially, the tire shape of the seal element eliminates sharp edges as may otherwise be found in a conventional system, thereby reducing the likelihood of the seal element snagging on the pipe wall where the pipe inner wall is irregular or damaged. Alternatively, or in addition, the elimination of sharp edges also reduces wear on the seal element. The seal element may be pre-formed and the seal element may be compliant such that the tool does not require high forces to load the tool into the pipe.

The tool may include a single seal element coupled to the body. Alternatively, a plurality of seal elements may be coupled to the body. In particular embodiments, the seal elements may be axially spaced defining a first, front seal element and a second, rear seal element. The provision of more than one seal element on the tool may facilitate traversal of a branch, tee, connection, intervention or other feature which may otherwise result in loss of sealing engagement with the pipe wall. The tool may be adapted to retain a pressure differential across at least one of the seal elements and may substantially overcome the risk that the tool will stall in the pipe due to loss of sealing engagement with the pipe inner wall at a branch connection.

Where a plurality of seal elements are provided, the tool may further include at least one bypass conduit adapted to permit fluid communication between the upstream fluid and at least one of the seal elements. The bypass conduit may be adapted to provide bypass of the front seal element where the front seal element, for example, passes a branch penetration, tee, connection or the like. The valves may be configured to ensure that the downstream seal portion of the front seal element is inflated as long as it affects a seal against the pipe wall. If, or when, the front seal element loses sealing engagement with the pipe wall, for example as the front seal element passes a branch connection, fluid may bypass the front seal element. The rear seal element may then be adapted to permit fluid at the upstream pressure to actuate the downstream seal portion of the rear seal element to ensure at least one of the seal elements provides sealing engagement with the pipe wall.

The tool may further include a lock for securing the tool within the pipe. The lock may define a first, retracted, configuration which permits movement of the tool through the pipe and a second, pipe gripping, configuration which restrains or secures the tool within the pipe.

The lock may be of any appropriate form and may, for example, include at least one locking arm coupled to the body. For example, the lock may include two, or an equispaced array of, locking arms adapted to engage diametrically opposed portions of the pipe inner wall. The lock may be actuated by any suitable manner. For example, the lock may be hydraulically actuated and may include a piston and cylinder arrangement, though pneumatic or mechanical actuation may be used where appropriate. In particular embodiments, the lock may be adapted for actuation by fluid in the pipe. For example, a first side of the piston may be adapted to receive upstream fluid to urge movement of the locking arms from the first, retracted, configuration to the second, pipe gripping, configuration. Alternatively, the lock may include a taper lock, wedge lock or the like, and the tool further includes at least one gripping member having a tapered surface for cooperating with a tapered surface on the body to move the, or each, gripping member into engagement with the pipe inner wall. The tool may thus also be used to isolate fluid flow through the pipe, where required.

According to a further aspect of the present invention there is provided a method of transporting a tool through a pipe, the method including the steps of providing a tool including a body and a fluid pressure activated seal element having oppositely directed seal portions, inserting the tool into a pipe so that the tool obstructs fluid flow through the pipe, the downstream directed seal portion activated by upstream fluid pressure, and motivating the tool through the pipe.

Inserting the tool into the pipe may create a fluid pressure differential across the tool between fluid upstream of the tool and fluid downstream of the tool. The tool may be motivated through the pipe by the pressure differential. The seal element may be inflated by the upstream fluid pressure. The upstream fluid may be directed into a chamber defined between the seal element and the body. The upstream fluid may be directed into the chamber until the chamber pressure is of substantially equal pressure to that of the upstream fluid pressure.

The downstream seal portion may be deformed into a cup shaped sealing surface. The downstream seal portion may be urged into sealing or enhanced sealing engagement with the pipe wall. The downstream seal portion may be activated by the upstream fluid pressure regardless of the direction of fluid flow through the pipe.

The tool may be operated in either of a first direction or a second direction by selecting the fluid flow direction in the pipe. The tool may be secured within the pipe. A payload may be transported through the pipe on the tool.

It will be recognized that any of the features described above in relation to any one of the aspects of the present invention may be used in combination with any of the features described in relation to any other of the aspects of the present invention.

BRIEF DESCRIPTION OF THE DRAWINGS

These and other aspects of the present invention will now be described, by way of example only, with reference to the accompanying drawings, in which:

FIG. 3 is a diagrammatic cross-sectional view of a tool according to a second embodiment of the invention, where fluid flow is in the first direction; and FIG. 4 is a diagrammatic cross-sectional view of the tool of FIG. 3, where the fluid flow is in the reverse direction;

DETAILED DESCRIPTION OF THE DRAWINGS

Figure 1:
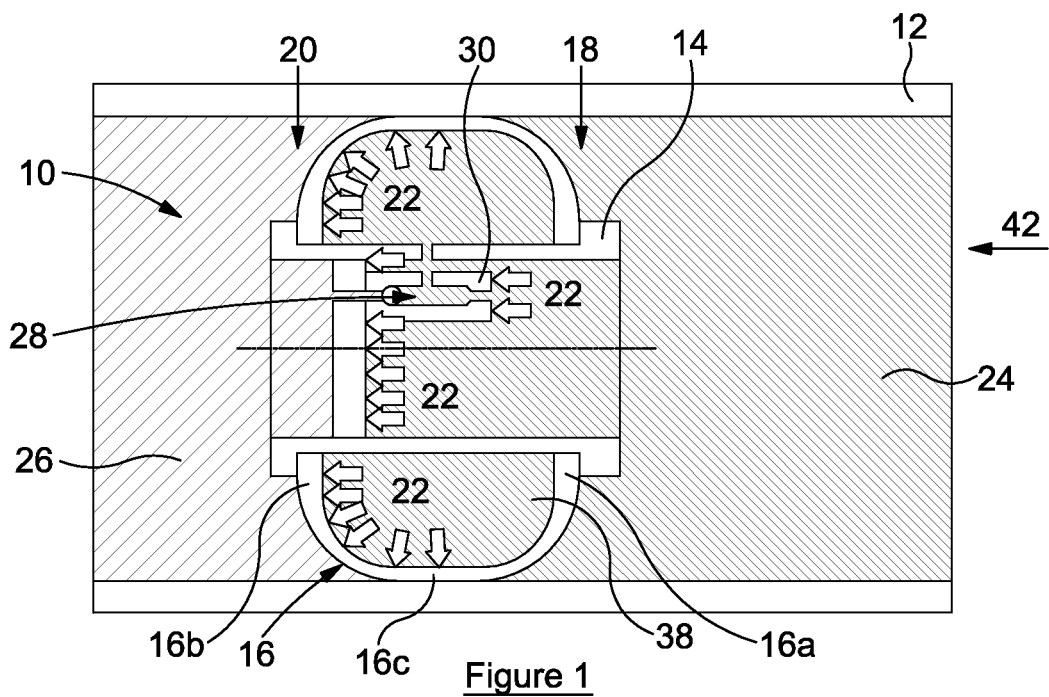
FIG. 1 is a diagrammatic cross-sectional view of a tool according to a first embodiment of the present invention, where fluid flow is in a first direction.
Figure 1A:
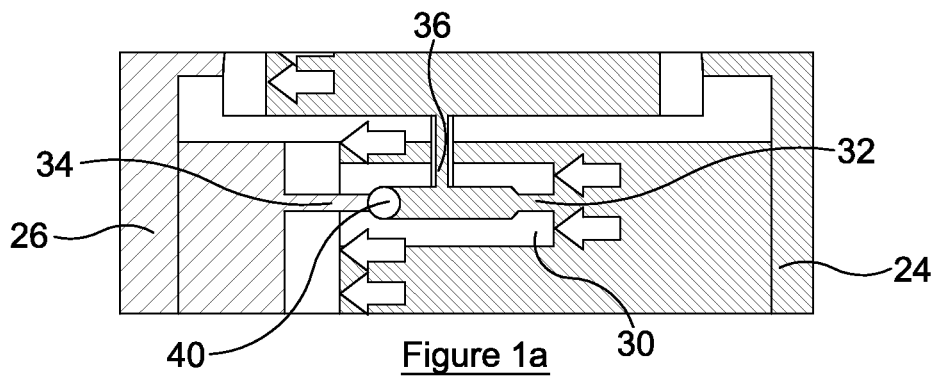
FIG. 1a is an enlargement of a portion of the tool of FIG. 1.
Figure 2:
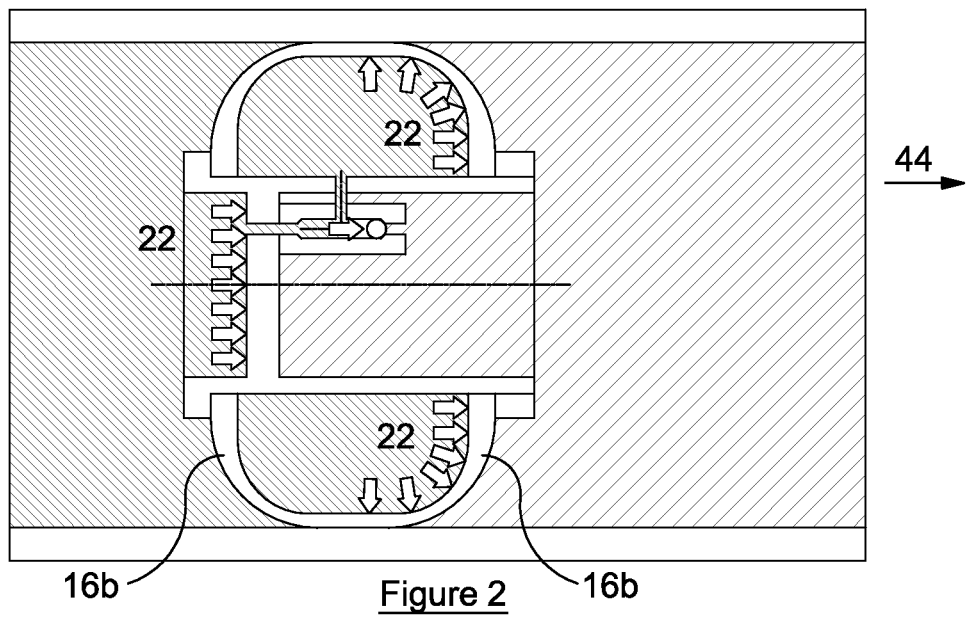
FIG. 2 is a diagrammatic cross-sectional view of the tool of FIG. 1, where fluid flow is in a reverse direction.

Referring initially to FIGS. 1, 1a and 2 of the drawings, there is shown diagrammatic cross-sectional views of a tool 10 in accordance with a first embodiment of the present invention. The tool 10 is adapted for location within a pipe 12 for containing a flowing fluid, though it will be understood that reference to the term pipe includes any tubular component of any cross-sectional form and includes, for example, an oil or gas pipeline, whether subsea, above or below ground, downhole tubing, or indeed any other tubular suitable for transport or storage of fluids.

As shown in FIG. 1, the tool 10 includes a body or core 14, and a seal element 16 is mounted to the core 14. The seal element 16 includes a pre-formed toroidal or tire-shaped seal element 16 which extends circumferentially around the core 14. The seal element 16 includes oppositely directed seal portions 16a and 16b, a first seal portion 16a located adjacent to a first side 18 of the tool 10 and a second seal portion 16b located adjacent to a second side 20 of the tool 10.

The seal element 16 is generally compliant and, on insertion into the pipe 12, a central portion 16c of the seal element 16 flexes on engagement with the pipe 12 to provide an initial seal between the tool 10 and the pipe 12. As the tire shape is pre-formed, the tool 10 is easily loaded into the pipe 12 and, for example, does not require the significant forces to insert the tool 10 into the pipe 12 that may otherwise be required to deflect planar disc seals of similar dimensions. The tool 10 thus obstructs fluid flow through the pipe 12 such that a pressure differential (shown by arrows 22) acts across the tool 10 between fluid 24 upstream of the tool 10 and fluid 26 downstream of the tool 10.

The tool 10 further includes a valve in the form of bi-directional check valve 28. The valve 28 includes a valve body 30 formed in the core 14, a first port 32 open to the first side 18 of the tool 10, a second port 34 open to the second side 20 of the tool 10 and a third port 36 for providing access to a chamber 38 defined between the seal element 16 and the core 14. The check valve 28 further includes a valve member in the form of a valve ball 40, the valve ball 40 being moveable within the valve body 30 to open and close the first and second ports 32 and 34, thereby permitting fluid flow between the fluid 24 and the chamber 38 or, alternatively, permitting fluid flow between the fluid 26 and the chamber 38. In use, the check valve 28 is adapted to permit activation of the downstream seal portion (whichever of the portions 16a, 16b is the downstream seal portion) by the upstream fluid pressure, as will be described below.

FIG. 1 shows the tool 10 when fluid flow through the pipe 12 is in a first direction 42 (from right to left as shown in FIG. 1). In this configuration, the first side 18 of the tool 10 is subject to higher, upstream, pressure, and the second side 20 of the tool 10 is subject to lower, downstream pressure so that the pressure differential 22 acts to urge the tool 10 through the pipe 12 in the first direction 42.

The valve 28 is also exposed to the pressure differential 22 as the first port 32 is open to the higher pressure upstream fluid 24 and the second port 34 is open to the lower pressure downstream fluid 26. The valve ball 40 moves in response to the pressure differential 22 to close the second port 34 and to permit the fluid 24 to flow into the chamber 38 to inflate the seal element 16. Furthermore, as the fluid 23 enters the chamber 38, the pressure will rise until the pressure in the inflated chamber 38 will be substantially equal to the fluid pressure on the first side 18 of the tool 10. Accordingly, there is substantially no differential pressure acting across the seal portion 16a when fluid flow is in the first direction 42. However, due to the difference in pressure between fluid in the chamber 38 and the second side 20 of the tool 10, the differential pressure 20 acts across the downstream seal portion 16b, urging the downstream seal portion 16b into sealing engagement with the pipe 12 and permitting the pressure differential 22 to drive the tool 10 through the pipe 12 in the first direction 42.

In addition, the tool 10 is capable of operation in more than direction as the check valve 28 is configured to ensure that the chamber 38 is always fluidly connected to the upstream fluid, whether this is the fluid 24 when the fluid flow is in the first direction 42 as shown in FIG. 1 or the fluid 26 when the fluid flow is in a reverse direction 44, as shown in FIG. 2 and as will be described below.

In the configuration shown in FIG. 2, the flow direction of fluid in the pipe 12 is in the reverse direction 44 (from left to right in FIG. 2). The first side 18 of the tool 10 is subject to lower, downstream, pressure and the second side 20 is subject to higher, upstream, pressure such that the pressure differential 22 acts in the reverse direction 44.

In use, the valve ball 40 moves under the reverse pressure differential 22 to permit the fluid 26 to enter the chamber 38 via ports 34 and 36. The pressure differential 22 acts across the downstream seal portion, which is now the seal portion 16a, and the seal portion 16a is urged into sealing engagement with the pipe 12. Accordingly, the pressure differential 22 is used to enhance the sealing capability of the tool 10 and to drive the tool 10 through the pipe 12 in the reverse direction 44. Advantageously, as the seal element is pre-formed and generally compliant, the tool 10 does not require high pressure loads in order to reverse the sealing direction as may otherwise be required with a disc seal arrangement. The reversal is provided simply by selecting which of the seal portions 16a and 16b is activated. Thus, the tool 10 is capable of meeting the operational requirements of a cup disc arrangement while permitting effective operation in one or more than one direction.

In reference now to FIGS. 3 and 4 of the drawings, there is shown a tool 110 according to a second embodiment of the present invention. The tool 110 may be used in pigging operations and/or for isolating a section of the pipe 12. The tool 110 of FIGS. 3 and 4 is substantially similar to the tool 10 of FIGS. 1 and 2 and like components are shown by like numerals incremented by 100.

As shown in FIG. 3, the tool 110 includes a lock 46 for use in securing the tool 110 within a pipe 112. The lock 46 includes locking members 48a and 48b, with each locking member 48a and 48b being pivotably coupled to a tool core 114 by a linkage arm 50a and 50b. A piston 52 and cylinder 54 are coupled between the linkage arms 50a, 50b. As shown in FIG. 3, a first side 56 of the piston 52 is fluidly coupled to fluid 124 upstream of the tool 110. The other side 58 of the piston 52 is coupled to fluid 126 downstream of the tool 110 by a conduit 60. Thus, when the direction of fluid flow is in the first direction 142, the tool 110 defines a first, retracted configuration.

With reference now to FIG. 4, when the direction of fluid flow is in the reverse direction 144, the piston 52 is adapted to translate relative to the cylinder 54, translation of the piston 52 resulting in pivotal movement of the linkage arms 50a and 50b relative to the core 114, which in turn moves the locking members 48a and 48b into gripping engagement with the pipe 112. The differential pressure 122 across the tool 110 is transferred through the core 114 to the pipe 112 via the linkage arms 50a and 50b and locking members 48a and 48b.

As per the arrangement of FIG. 2, the valve ball 140 moves to permit fluid flow into the chamber 138 from the second side 120 of the tool 110 and substantially prevents fluid flow from the first side 118. The pressure differential 122 acts across the seal portion 116a and deforms the seal portion 116a into sealing engagement with the pipe wall. Tools 110 according to this embodiment of the present invention may thus permit isolation of fluid through the pipe 110. Thus, in one mode of operation, the tool 110 is adapted to be pigged into the pipe 112 and then used to isolate the pressure behind the tool 110 to permit maintenance or repair to the pipe 112 to insert a branch connection or otherwise provide access to the pipe 112.

It should be understood that the embodiments described are merely exemplary of the present invention and that various modifications may be made without departing from the scope of the invention.

For example, though a fluid activated piston and cylinder arrangement has been described, the lock may take any appropriate form and may include an active lock system, such as hydraulically or pneumatically operated lock selectively moveable between retracted and extended configurations. Alternatively, the lock may include a passive lock system in the form of a trailing lever, wedge lock or the like.

Figure 6:
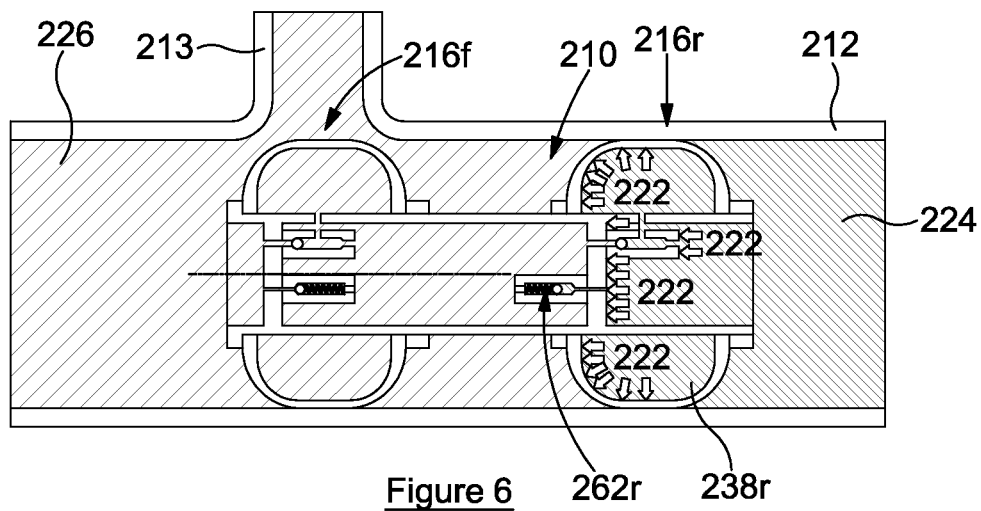
FIG. 6 is a diagrammatic cross-sectional view of the tool of FIG. 5, shown traversing the branch penetration.
Figure 7:
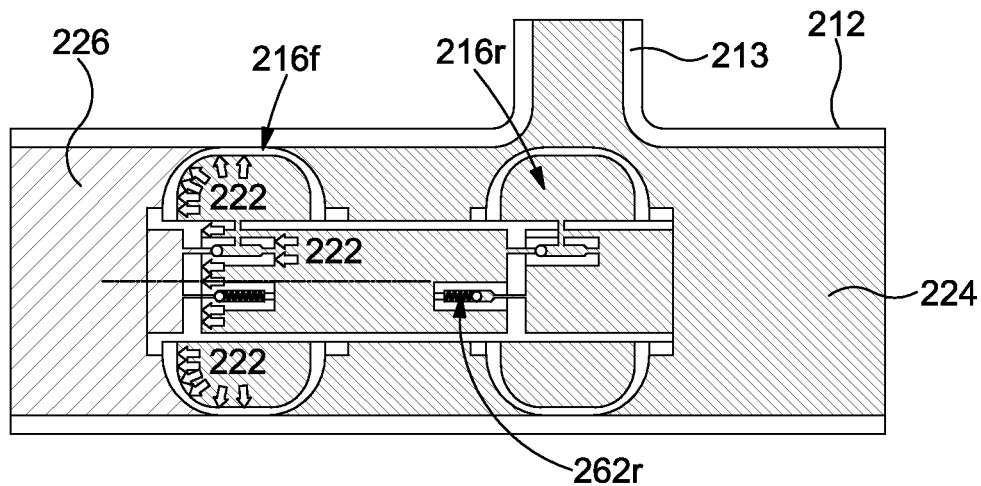
FIG. 7 is a diagrammatic cross-sectional view of the tool of FIGS. 5 and 6, on passing the branch penetration.

Although one seal element has been described, it will be recognised that more than seal element may be provided. For example, as shown in FIGS. 5 to 7 of the drawings, there is shown a tool 210 according to a third embodiment of the present invention shown located within a pipe 212 having a branch penetration 213.

Figure 5:
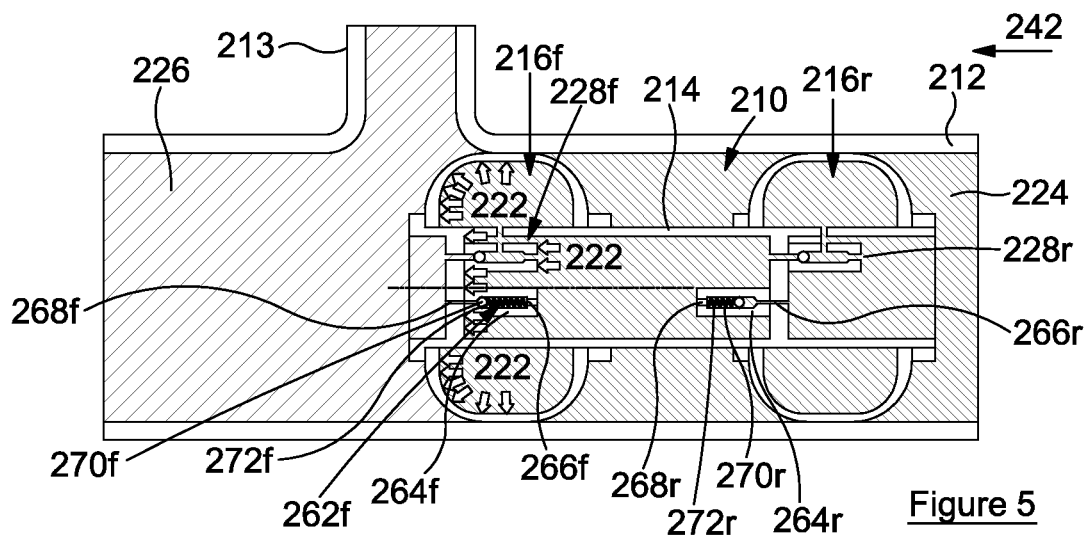
FIG. 5 is a diagrammatic cross-sectional view of a tool according to a third embodiment of the present invention, shown prior to encountering a branch penetration in the pipe.

As shown in FIG. 5, two axially spaced seal elements are provided on a core 214, a first seal element 216f and a second seal element 216r. The seal elements 216f and 216r are substantially similar to the seal elements 16 and 116.

A valve 228f and 228r is associated with each of the seal elements 216f and 216r. Furthermore, a bypass conduit 262f and 262r is associated with each of the seal elements 216f and 216r for providing uni-directional bypass of the respective seal element 216f and 216r. This ensures that the front seal element (the first seal element when fluid flow in the first direction or the second seal element when fluid flow is in the reverse direction) is coupled to the higher pressure side while a seal is maintained with the pipe 212.

As shown in FIG. 5, the bypass conduit 262f associated with the first seal element 216f includes a body 264f coupled to the core 214, a port 266f in fluid communication with fluid 224 on the higher pressure side of the tool 210, and a port 268f in fluid communication with fluid 226 on the lower pressure side of the tool 210. The bypass conduit 262f also has a member 270f which is coupled to the body 264f by a spring 272f, and the member 270f is adapted to move relative to the body 264f to close the bypass conduit 262f in response to a pressure differential 222 across the tool 210.

The bypass conduit 262r associated with the second seal element 216r also includes a body 264r coupled to the core 214 and ports 266r and 268r. As shown in FIG. 5, both ports 266r and 268r are in fluid communication with the fluid 224. A member 270r is coupled to the body 214 by a spring 272r and when the fluid flow in the first direction (as shown by arrow 242 in FIG. 5), the member 270r is biased by the pressure differential 222 to a position where both ports 268r and 266r are open, thereby permitting bypass of the second seal element 216r.

As shown in FIG. 6, when the tool 210 traverses the branch penetration 213, fluid 226 from the lower pressure side can bypass the first seal element 216f such that sealing engagement between the first seal element 216f and the pipe 212 may be lost. In this configuration, fluid 224 from a higher pressure side is directed to a chamber 238r of the second seal element 216r to ensure that at least one of the seal elements 216f and 216r provides sealing engagement with the pipe 212. Accordingly, a differential pressure 222 acts to drive the tool 210 through the pipe 212 and past the branch penetration 213 until the first seal element 216f re-engages the pipe 212. The bypass 262r permits fluid pressure to build between the seal elements 216f and 216r until the pressure differential 222 across the first seal element 216f is sufficient to resume operation (as shown in FIG. 7).

While operation of the tool 210 is shown in FIGS. 5, 6 and 7 in relation to fluid flow in a first direction (shown by arrow 242 in FIGS. 5, 6 and 7), it will readily be understood that the tool 210 can operate in both the forward and reverse directions as the valves 228f and 228r of both the first and second seal elements 216f and 216r are provided with the bypass conduits 262f and 262r to permit fluid to be directed to the rear seal element (whichever of the seal elements 216f and 216r is the rear seal element), thereby maintaining a seal across a branch penetration in either forward or reverse directions.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A bi-directional and piggable pipeline tool for bi-directional movement in a pipe in one of a first direction in response to fluid flow in the pipe in said first direction and a second direction in response to fluid flow in the pipe in said second direction, the tool being propelled through the pipe in said first direction or said second direction by a fluid pressure differential created across the tool between fluid upstream of the tool and fluid downstream of the tool, the tool comprising:
a body adapted for location in a pipe containing a flowing fluid;
a fluid pressure activated seal element coupled to the body, the fluid pressure activated seal element comprising oppositely directed seal portions, and wherein the seal element is pre-formed to engage the pipe on insertion of the tool into the pipe, the seal element obstructing fluid flow through the pipe such that a fluid pressure differential created across the tool between fluid upstream of the tool and fluid downstream of the tool propels the tool through the pipe;
a valve arrangement adapted to permit activation of a downstream seal portion of the oppositely directed seal portions of the seal element by upstream fluid pressure, wherein the valve arrangement comprises a dual acting check valve including a first port in fluid communication with the upstream fluid and a second port in fluid communication with the downstream fluid and including a valve member adapted for movement by the upstream fluid pressure to selectively open and close access to the first port and the second port to provide fluid communication between the upstream fluid and the seal element to facilitate activation of the downstream seal portion; and a chamber defined between the pressure activated seal element and the body, wherein the chamber is in fluid communication with the dual acting check valve, the dual acting check valve allowing the chamber to receive upstream fluid when the dual acting check valve has been opened by the upstream fluid until the chamber pressure is of substantially equal pressure to that of the upstream fluid pressure, wherein the tool is a bi-directional and piggable pipeline tool.

2. The tool of claim 1, wherein the tool is configured to isolate a section of the pipe.

3. The tool of claim 1, comprising a plurality of the fluid pressure activated seal elements coupled to the body.

4. The tool of claim 3, wherein the tool is adapted to retain a pressure differential across at least one of the plurality of seal elements.

5. The tool of claim 3, wherein the tool further comprises at least one bypass conduit adapted to permit fluid communication between the upstream fluid and at least one of the plurality of seal elements.

6. The tool of claim 1, further comprising a lock for securing the tool within the pipe.

7. The tool of claim 6, wherein the lock is adapted for actuation by fluid in the pipe.

8. The pipeline tool as recited in claim 1 wherein the fluid pressure activated seal element is inflatable.

9. The pipeline tool of claim 1 wherein the bi-directional and piggable pipeline tool is adapted to define an enclosed chamber between an inner surface of the fluid pressure activated seal element and the body.

10. The pipeline tool of claim 1 wherein the seal element comprises a toroidal or tire-shaped seal element.

11. The pipeline tool of claim 1 wherein the valve arrangement comprises a third port for providing fluid communication with the chamber.

12. A method of transporting a tool through a pipe, the method comprising the steps of:

providing a bi-directional and piggable pipeline tool comprising a body and a fluid pressure activated seal element having oppositely directed seal portions, wherein the seal element is pre-formed to engage the pipe on insertion of the tool into the pipe, the seal element obstructing fluid flow through the pipe such that a fluid pressure differential created across the tool between fluid upstream of the tool and fluid downstream of the tool propels the tool through the pipe;

inserting the bi-directional and piggable pipeline tool into a pipe so that the bi-directional and piggable pipeline tool obstructs fluid flow through the pipe;

activating a downstream directed seal portion by upstream fluid pressure using a valve arrangement comprising a dual acting check valve, the dual acting check valve including a first port in fluid communication with upstream fluid and a second port in fluid communication with downstream fluid and including a valve member adapted for movement by the upstream fluid pressure to selectively open and close access to the first port and the second port to provide fluid communication between the upstream fluid and the seal element to facilitate activation of the downstream seal portion, wherein a chamber is defined between the pressure activated seal element and the body, the chamber being in fluid communication with the dual acting check valve, the dual acting check valve allowing the chamber to receive upstream fluid when the dual acting check valve has been opened by the upstream fluid until the chamber pressure is of substantially equal pressure to that of the upstream fluid pressure; and motivating the bi-directional and piggable pipeline tool through the pipe in one of a first direction in response to fluid flow in the pipe in said first direction and a second direction in response to fluid flow in the pipe in said second direction, the tool being propelled through the pipe in said first direction or said second direction by a fluid pressure differential created across the tool between fluid upstream of the tool and fluid downstream of the tool.

13. The method of claim 12, wherein the step of inserting the bi-directional and piggable pipeline tool into the pipe creates a fluid pressure differential across the bi-directional and piggable pipeline tool between fluid upstream of the bi-directional and piggable pipeline tool and fluid downstream of the bi-directional and piggable pipeline tool.

14. The method of claim 12, comprising the step of directing upstream fluid into a chamber defined between the fluid pressure activated seal element and the body.

15. The method of claim 14, comprising the step of directing upstream fluid into the chamber until the chamber pressure is of substantially equal pressure to that of the upstream fluid pressure.

16. The method of claim 12, comprising the step of securing the bi-directional and piggable pipeline tool within the pipe.

* * * * *